United States Patent
Rodriguez Bravo et al.

(10) Patent No.: US 10,726,137 B2
(45) Date of Patent: *Jul. 28, 2020

(54) COPY PROTECTION FOR SECURED FILES

(71) Applicant: International Business Machines Corporation, Armonk, NY (US)

(72) Inventors: Cesar Augusto Rodriguez Bravo, Alajuela (CR); Kirk Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/287,034

(22) Filed: Feb. 27, 2019

(65) Prior Publication Data

US 2020/0193034 A1 Jun. 18, 2020

Related U.S. Application Data

(63) Continuation of application No. 15/585,846, filed on May 3, 2017, now Pat. No. 10,303,888.

(51) Int. Cl.
*G06F 21/60* (2013.01)
*G06F 21/10* (2013.01)
(Continued)

(52) U.S. Cl.
CPC .......... *G06F 21/602* (2013.01); *G06F 21/10* (2013.01); *G06F 21/6209* (2013.01); *G06F 21/6218* (2013.01); *G06F 21/6254* (2013.01); *H04L 63/105* (2013.01); *G06F 21/62* (2013.01); *G06F 21/6272* (2013.01); *G06K 19/06037* (2013.01);
(Continued)

(58) Field of Classification Search
CPC . G06F 7/04; G06F 17/30; G06F 21/62; G06F 21/6209; G06F 21/6218; G06F 21/6254; G06F 21/6272; G06F 21/60; G06F 21/10; G06F 21/602; G06K 19/06; G06K 19/06037; H04N 7/16; H04L 2209/16; H04L 63/0492; H04L 63/101; H04L 63/107; H04L 63/108; H04L 29/06; H04L 63/105

See application file for complete search history.

(56) References Cited

U.S. PATENT DOCUMENTS 5,787,068 A    7/1998   Arps et al.
5,925,126 A * 7/1999   Hsieh ................. G06F 21/6281
                                                       726/19

(Continued)

OTHER PUBLICATIONS

Danehkar, A., "Injective Code inside Import Table," https://www.codeproject.com/articles/14360/injective-code-inside-import-table, 21 pgs., Mar. 29, 2007, printed Mar. 2, 2017.

(Continued)

*Primary Examiner* — Jayesh M Jhaveri
(74) *Attorney, Agent, or Firm* — James L. Olsen

(57) ABSTRACT

Embodiments of the present disclosure relate to copy protection. A request to copy a file from a requestor with one or more privileges sufficient to access the file may be received. The file may be determined to be subject to copy protection. In response to determining that the file is subject to copy protection, a notification of the copy attempt may be transmitted. Copy protection may then be applied to the file.

4 Claims, 6 Drawing Sheets

(51) Int. Cl.
    *G06F 21/62*     (2013.01)
    *H04L 29/06*     (2006.01)
    *G06K 19/06*     (2006.01)

(52) U.S. Cl.
    CPC .......... *H04L 63/04* (2013.01); *H04L 63/0428* (2013.01); *H04L 63/0492* (2013.01); *H04L 63/083* (2013.01); *H04L 63/101* (2013.01); *H04L 63/107* (2013.01); *H04L 63/108* (2013.01); *H04L 2209/08* (2013.01); *H04L 2209/16* (2013.01); *H04L 2209/60* (2013.01)

(56) References Cited

U.S. PATENT DOCUMENTS

| | | | |
|---|---|---|---|
| 6,785,815 | B1 | 8/2004 | Serret-Avila et al. |
| 7,219,354 | B1* | 5/2007 | Huang .................... G06F 9/468 709/203 |
| 9,418,222 | B1 | 8/2016 | Rivera et al. |
| 9,742,742 | B1* | 8/2017 | Monk .................... H04L 9/3263 |
| 10,037,429 | B1 | 7/2018 | Rodriguez Bravo et al. |
| 2002/0188849 | A1* | 12/2002 | Kwan ..................... G06F 21/64 713/176 |
| 2004/0086119 | A1 | 5/2004 | Moskowitz |
| 2005/0288939 | A1* | 12/2005 | Peled ..................... G06F 21/10 709/229 |
| 2006/0150249 | A1* | 7/2006 | Gassen ................ G06F 21/554 726/23 |
| 2011/0055585 | A1 | 3/2011 | Lee |
| 2011/0307705 | A1 | 12/2011 | Fielder |
| 2012/0089481 | A1 | 4/2012 | Iozzia et al. |
| 2013/0047221 | A1* | 2/2013 | Warnock .............. G06Q 20/123 726/4 |
| 2014/0137273 | A1* | 5/2014 | Workman ............... G06F 21/60 726/32 |
| 2015/0046998 | A1 | 2/2015 | Harwood et al. |
| 2015/0047032 | A1 | 2/2015 | Hannis et al. |
| 2015/0096048 | A1 | 4/2015 | Zhang et al. |
| 2016/0234236 | A1 | 8/2016 | Silva et al. |
| 2016/0308895 | A1 | 10/2016 | Kotler et al. |
| 2017/0244729 | A1* | 8/2017 | Fahrny ................ H04L 63/1416 |
| 2017/0317828 | A1* | 11/2017 | Reinhold ................ G06F 21/31 |
| 2018/0322294 | A1 | 11/2018 | Rodriguez Bravo et al. |
| 2018/0322296 | A1 | 11/2018 | Rodriguez Bravo et al. |
| 2018/0322297 | A1 | 11/2018 | Rodriguez Bravo et al. |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Unknown, "Disable Files, Folders and Text from Being Copied or Moved in Windows," https://www.raymond.cc/blog/visable-files-folders-and-text-from-being-copied-or-moved-in-windows/, 7 pgs., printed Mar. 3, 2017.

Unknown, "Dummy files for neutering spyware," http://cexx.org/dummies.htm, 2 pgs., printed Mar. 2, 2017.

Unknown, "How to monitor windows filesystem, copy, move, delete and create," https://answers.splunk.com/answers/111457/how-to-monitor-windows-filesystem-copy-move-delete-and-create.html, 4 pgs., printed Mar. 2, 2017.

Unknown, "Tracking or auditing file copy," http://serverfault.com/questions/224827/tracking-or-auditing-file-copy, 2 pgs., printed Mar. 2, 2017.

Wikipedia, "passwd," https://en.wikipedia.org/wiki/Passwd#Shadow_file, 5 pgs., printed Mar. 2, 2017.

Wikipedia, "Salt (cryptography)," https://en.wikipedia.org/wiki/Salt_%28cryptography%29, 4 pgs., printed Mar. 2, 2017.

Microsoft, "Encrypt or decrypt a folder or file," Windows How-to, https://web.archive.org/web/20160623234334/http://windows.microsoft.com/en-us/windows/encrypt-decrypt-folder-file#1TC=windows-7, 1 page, printed Dec. 7, 2017.

Unknown, "Dynamic Privilege Management: Share Account Access Like you Want to," Onion ID, https://web.archive.org/web/20160313052531/https://www.onionid.com/features/dynamic-privilege-management/, 7 pages, printed Dec. 7, 2017.

IBM, List of IBM Patents or Patent Applications Treated as Related, Feb. 26, 2019, 2 pages.

* cited by examiner

COPY PROTECTION FOR SECURED FILES

BACKGROUND

The present disclosure relates generally to the field of computer security, and more particularly to copy protection and manipulation.

Access control may be implemented in computing environments to provide security. In some computing environments, one or more users may have privileged access and may be able to complete privileged tasks (e.g., adjusting kernel options, modifying system files, adjusting disk limits, monitoring users, creating device nodes, and the like). In such environments, non-qualified users may be prevented from making drastic changes to the system/user configuration (e.g., at the operating system level). Further, privileged control may prevent non-qualified users from accessing, deleting, or modifying content protected by a privileged command (e.g., secure files) or other privileged arrangement.

SUMMARY

Embodiments of the present disclosure include a method, computer program product, and system for copy protection. The method may include receiving a request to copy a file from a requestor with one or more privileges sufficient to access the file. Further, the method may include determining that the file is subject to copy protection. In response to determining that the file is subject to copy protection, a notification of the copy attempt may be transmitted, and copy protection may be applied to the file.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
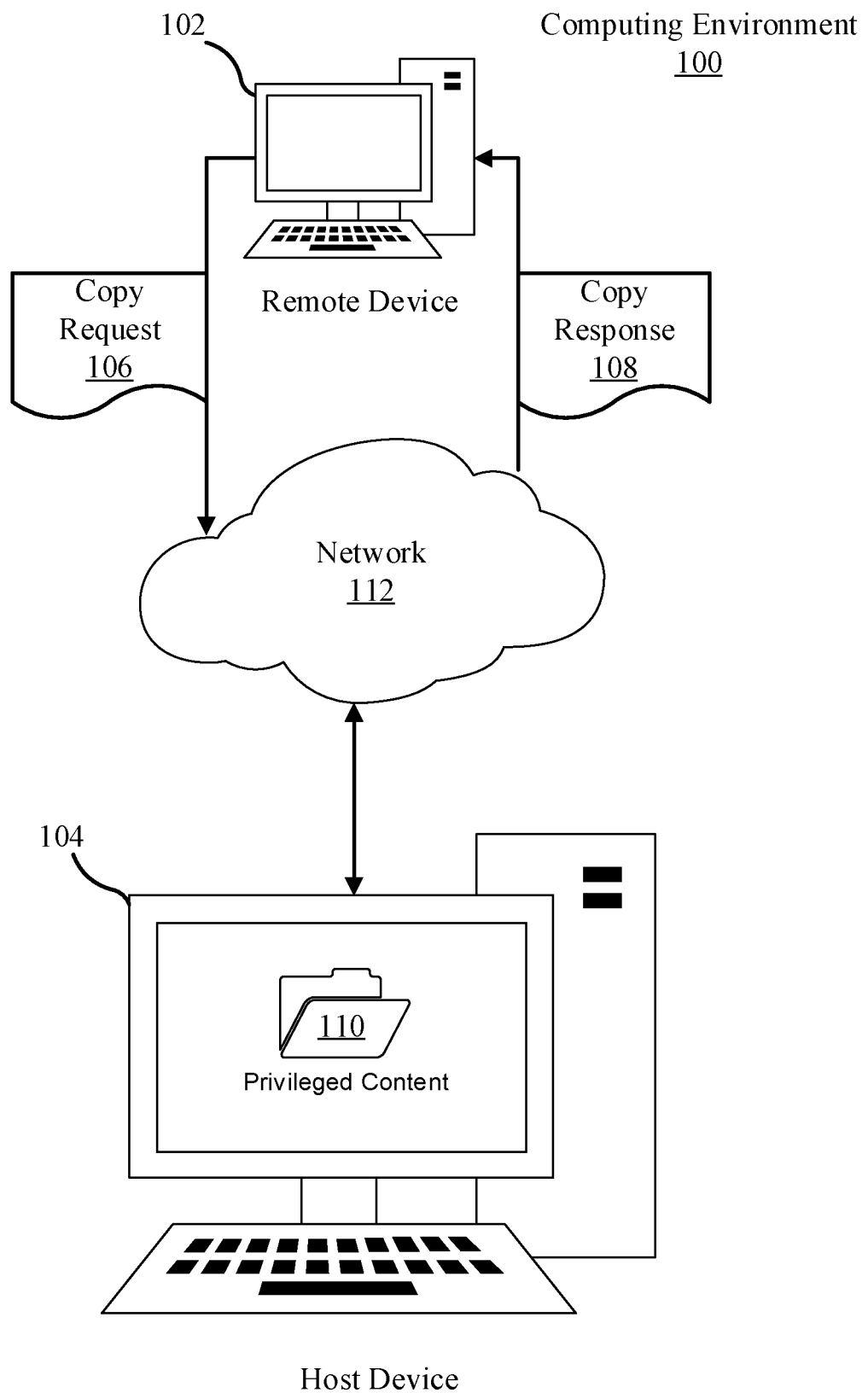
FIG. 1 depicts a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer security, and in particular to copy protection and copy manipulation. While the present disclosure is not necessarily limited to such applications, various aspects of the disclosure may be appreciated through a discussion of various examples using this context.

Security breaches are occurring in greater frequency as a result of the large amount of data stored electronically. Often, usernames and passwords are stolen (e.g., via Wi-Fi interception, dictionary attacks, or viruses, to name a few tactics) enabling hacker(s) to monitor the system under an authorized account while intercepting data over time. If hacker(s) obtain credentials for highly privileged accounts (e.g., super users or root access accounts), they may have access to secure files containing passwords (hashes) for users, machines, or databases. If the system is compromised in this manner, even temporarily, hacker(s) will often attempt to retrieve copies of files containing user, system, or database password hashes (e.g., passwd files or shadow files), to expand their access to associated machines, systems, and databases. Some systems routinely allow access to encrypted forms of these files and perform decryption only for authentication purposes, within a process ordinarily inaccessible to the hacker(s). Whether the system is compromised thus allowing hacker(s) access to these files, or whether hacker(s) access encrypted forms of these files as if performing a routine authentication, a successful copy attempt performed by the hacker(s) will leave the files (at least in their encrypted format) available on systems where the hacker(s) can attempt to exploit the information in these files. The information that can be obtained by eventually "cracking" these files, in their copied form, may allow the hacker(s) to access additional data sources, such as servers and storage networks, for which they are not legitimately authenticated. Further, because hash folders may contain passwords required to access personal accounts, sensitive data associated with administrator or other accounts may be at risk.

The present disclosure overcomes the aforementioned complications by preventing read+write (copy) access of secure data files. By preventing copy access (e.g., read+write access) to secure files, even in the event that a user has root access or other privileged access, passwords and files related to local/additional machines/databases may be secured.

According to embodiments of the present disclosure, a request to copy a file requiring root or other privileged access may be identified and analyzed. A copy protection protocol may be triggered. In some embodiments, the copy protection protocol may include blocking the copy attempt. In some embodiments, the copy protection protocol may include generating a response based on the copy request. Further, account information may be retrieved from the requestor, and further action may be taken. In some embodiments, the account associated with the requestor may be blocked or restricted to prevent further data interception associated with the computing environment. Additionally a communication or alert with information about the possible intrusion and copy attempt can be triggered.

FIG. 1 depicts an example computing environment 100 in which illustrative embodiments of the present disclosure may be implemented. In some embodiments, the computing environment 100 may include a remote device 102 and a host device 104. In some embodiments, there may be more than one of remote device 102, host device 104, or both. In other embodiments there may be only one computing device (e.g., only a host device and no remote device).

Consistent with various embodiments, the host device 104 and the remote device 102 may be computer systems, mobile devices, or Internet of Things ("IoT") enabled devices. The remote device 102 and the host device 104 may include one or more processors and one or more memories. The remote device 102 and the host device 104 may be configured to communicate with each other through an internal or external network interface. The network interfaces may be, in some embodiments, modems or network interface cards. The remote device 102 and/or the host device 104 may be equipped with a display or monitor. Additionally, the remote device 102 and/or the host device 104 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device 102 and/or the host device 104 may be servers, desktops, laptops, or hand-held devices. In some embodiments, the remote device 102 and/or the host device 104 may be devices embedded in physical objects, such as consumer products, participating in an IoT or other arrangement of embedded devices.

The remote device 102 and the host device 104 may be distant from each other and may communicate over a network 112. In some embodiments, the host device 104 may be a central hub from which remote device 102 and one or more additional remote device(s) can establish a communication connection, such as in a client-server networking model. Alternatively, the host device 104 and remote device 102 may be configured in any other suitable networking relationship (e.g., in a peer-to-peer (P2P) configuration or using any other network topology).

The network 112 may be implemented using any number of any suitable communications media. For example, the network 112 may be a wide area network (WAN), a local area network (LAN), an Internet, or an intranet. In certain embodiments, the remote device 102 and the host device 104 may be local to each other and may communicate via any appropriate local communication medium. For example, the remote device 102 and the host device 104 may communicate using a local area network (LAN), one or more hardwire connections, a wireless link or router, or an intranet. In some embodiments, the remote device 102 and the host device 122 may be communicatively coupled using a combination of one or more networks and/or one or more local connections. For example, remote device 102 may be hardwired to the host device 104 (e.g., connected with an Ethernet cable) while additional remote devices may communicate with the host device using the network 112 (e.g., over the Internet).

In some embodiments, the network 112 may be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 112.

The remote device 102 may be configured to transmit a copy request 106 to the host device 104. The copy request 106 may be transmitted to the host device depending on the communication configuration (e.g., over network 112 or through an Ethernet cable or wireless network connection). The copy request 106 may be directed toward privileged content 110 which is accessible (e.g., for read/write access) only by a user with one or more privileged access (e.g., super user or root account privilege). In response to the copy request 106, the host device 104 may be configured to transmit a copy response 108 to the remote device 102. The copy response 108 may include privileged content 110.

The privileged content 110 may be any content protected by privilege control. Privilege control may delegate authority over tasks to specific users in a computing environment. Examples of privileged tasks which may be accessible to users having privileged access include adjusting kernel options, modifying system files, modifying runlevel, adjusting disk or other resource usage limits, monitoring users, creating device nodes or other objects or data structures corresponding to allocated resources, creating or removing users/groups, or modifying subdirectories containing executable programs. Accordingly, privileged content 110 may include system files and subdirectories available only to a qualified user. In some embodiments, privileged content 110 includes files containing hashes of passwords associated with a computing environment.

In some embodiments, the copy response 108 may include transmitting response data based on the privileged content 110. For example, if privileged content 110 is a file containing password hashes (e.g., a passwd or shadow file), the host device 104 may be configured to transmit response data including obfuscated, modified, or corrupted versions or copies of the hash file. This may be used to provide altered (e.g., dummy, fake, corrupted, modified, or unintelligible) hashes to the requestor, to not only prevent brute force cracking of the real password hashes but also deter further attempts to retrieve and crack them. The response also may hide or forgo providing any indication that the data request was blocked or otherwise intercepted, which may confuse the requester and thereby reduce the amount of time the requestor has to crack the hashes.

However, in some embodiments, the copy response 108 may include blocking the copy request, and indicating to the requestor that the copy request has been blocked. In these embodiments, no files may be provided to the requestor, and the copy request may be prevented entirely.

While FIG. 1 illustrates a computing environment 100 with a single host device 104 and a single remote device 102, suitable computing environments for implementing embodiments of this disclosure may include any number of remote devices and host devices. The various models, modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). A suitable computing environment for implementing embodiments of this disclosure also may include a single computer with no remote devices or components.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
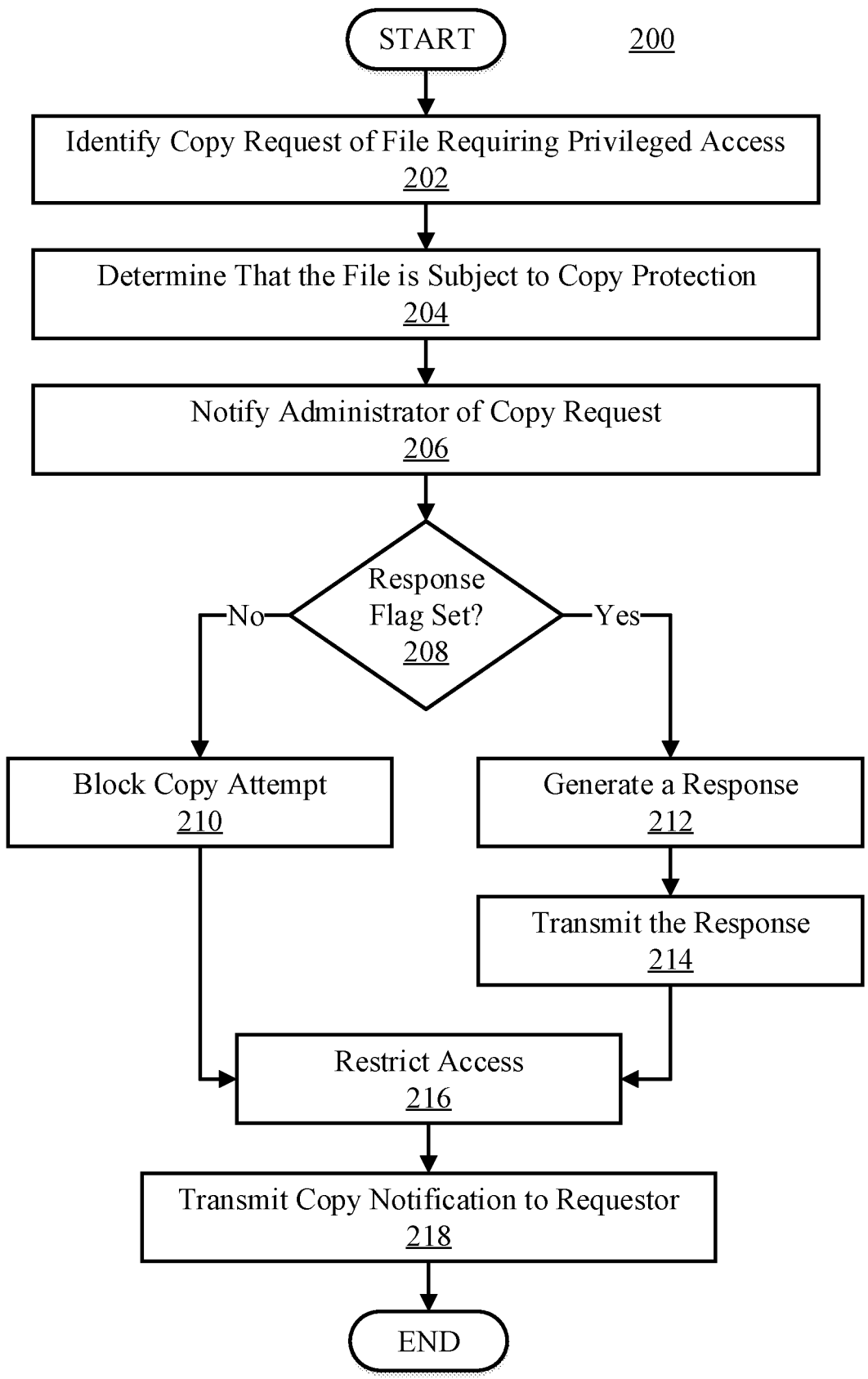
FIG. 2 depicts a flowchart of an example method for identifying and responding to a copy request of a file subject to copy protection, in accordance with embodiments of the present disclosure.

Referring now to FIG. 2, shown is a flowchart of an example method 200 for identifying and responding to a copy request of a file subject to copy protection, such as a file containing one or more hashes, in accordance with embodiments of the present disclosure. The method 200 may be performed by a computer system (e.g., host device 104 shown in FIG. 1). In some embodiments, the method 200 may be performed automatically (e.g., without user input/ action). In some embodiments, one or more operations of the method 200 may be performed by the computer system in response to user input.

Method 200 may start at operation 202, where a copy request on a file requiring privileged access may be identified. The copy request may be identified in any suitable manner. In some embodiments, the copy request may be received by a network interface (I/F), forwarded to a processor, and thereafter transferred to memory. In some embodiments, the copy request may originate at the machine on which the file requiring privileged access resides. Either way, the request may be analyzed to determine whether the request requires privileged access.

In some embodiments, the copy request may be compared to a list of all read+write (copy) requests requiring privileged access. In these embodiments, if the copy request corresponds to a request present on the list, then the request may be determined to require privileged access. In some embodiments, the request may be directed toward an account with no privileged access, and if the file targeted by the request is inaccessible (e.g., the request is blocked or prevented), then the request may be determined to require privileged access. However, determining that the request requires privileged access may be completed in any other manner.

After a copy request of a file requiring privileged access is identified, at operation 204, the requested file may be analyzed to determine whether it is subject to copy protection. The analysis may consider whether the requested file contains one or more hashes representing usernames, passwords, or other sensitive content. Some copy requests requiring privileged access may not require copy protection, as the requested files may not contain sensitive information. Hash files, on the other hand, may require copy protection, as they correspond to passwords associated with the computing environment (e.g., administrator account passwords, client access passwords, desktop account passwords, web-account passwords). If the hash file is compromised (e.g., read or copied), then the passwords may be cracked by a hacker using any method (e.g., brute force password cracking, rainbow tables, etc.). Also, copy protection in accordance with the present disclosure may be applied to selected files other than hash files.

Files containing hashes may be identified in any manner. In some embodiments, an identifier (e.g., name) associated with a file may be used to determine whether the file includes one or more hashes. For example, if the name of the file corresponds to that of a file in which hashes are stored, the file may be determined to include one or more hashes (e.g., a passwd or shadow file). Copy protection may be applied to files selected in other ways, such as (for example) all files in a folder configured for copy protection by a user or an administrator.

In some embodiments, data associated with a file, such as metadata, a certificate, or header content, may be used to determine whether the file contains sensitive data and is thus subject to copy protection via one or more of the methods disclosed herein. In some embodiments, the data associated with the file is found in the nature of the content of the file itself. In some embodiments, for example, the entropy of all of part of the content of a file may be used to determine whether that content is encrypted. Encrypted content is likely to have a relatively high degree of entropy compared to unencrypted content. The entropy of content in a file is a measure of the distribution of various bytes that can exist in the file.

In some embodiments, the length of the file may be used to determine that the file includes one or more hashes, and may indicate that the file is subject to copy protection. Because hashes include a fixed amount of data, the number of passwords associated with the system may be multiplied by the amount of data generated per hash, which may be used to determine whether the file contains one or more hashes. For example, if a requestor transmits a copy request for a file containing 600 bits of data, and there are 6 passwords each generating 100 bit hash values, then the file may be determined to include hashes (e.g., 6 passwords×100 bits=600 bits). Further, in these embodiments, thresholds or error allowances may be used to determine whether a file contains one or more hashes. Following the previous example, a threshold file size of 700 bits may be implemented, and any file containing fewer than 700 bits may be determined to include hashes. Further, if an error allowance is set to ±10%, and the hash value for comparison is 600 bits, and if the file contains 540-660 bits, then the file may be determined to include one or more hashes.

Additionally, determining whether a file includes one or more hashes may be completed by comparing each data set (e.g., hash) included in the file. Because hashes generated by a hash function are all of a fixed length (e.g., assuming that the passwords are run through the same hash function), if each data set corresponding to a hash is compared, and if they are all of identical length, then the file may be determined to include one or more hashes. For example, if the hash function generates hash values of 100 bits, and if there are 6 data sets in a file each having 100 bits of data, then the file may be determined to include one or more hashes. Any suitable method may be used to determine whether a file contains one or more hashes, consistent with embodiments of the present disclosure.

In some embodiments, after a copy request directed toward a hash file or other file subject to copy protection is identified, a notification may be transmitted to a user of the host device (e.g., host device 104), typically a system administrator, at operation 206. In these embodiments, the notification transmitted to the administrator may include information relating to the requestor and a notification of the copy attempt. This information may include the requestor's IP address, account information, MAC address, domain, physical location, and any other applicable data. Further, information related to the copy request including a timestamp, the requested file name, and any applicable metadata may be transmitted to the administrator. This may allow the user to take action (e.g., to prevent data loss or security breaches), including investigating the copy attempt.

Whether or not a notification is transmitted at operation 206, after the requested file is determined to include one or more hashes or is otherwise subject to copy protection a response flag may be implemented to determine the appropriate copy protection to be applied at operation 208. The response flag may indicate whether or not a response directed to the requestor is appropriate. Though a response flag is administered in method 200, any other suitable method of selecting the appropriate copy protection may be used. In some embodiments, there may be no response criterion, as a response may always be completed (e.g., see operation 212). Likewise, in some embodiments, there may be no response criterion, as a response may never be completed (e.g., see operation 210).

In some embodiments, the response flag is a simple Boolean value or an expression or function that returns a Boolean value. In other embodiments, other data structures can be used instead of a Boolean value. Such a data structure may be applicable to the file subject to copy protection, or to the copy protection means, or to the system or environment in which aspects of the present disclosure are embodied. In any case, if the response flag is set, then operation 208 may move forward to operation 212, where a response is generated in response to the copy request. If the response flag is not set, then operation 208 may move forward to operation 210, where the copy request is blocked.

At operation 210, if the response flag is not set, the copy request may be blocked. In some embodiments, the copy request may be blocked by not completing the request. In some embodiments, the copy request may be intercepted (e.g., by an application or the operating system) such that it may not be executed, or such that a modified form of the requested copy operation may be executed. Further, in some embodiments, the copy request may be forwarded to a dead end, where the request will never be completed. In some embodiments, the request may be added to a blacklist, and blocked in response to receiving the request. In some embodiments, the request may not be present on a whitelist of acceptable requests, and blocked in response to the reception of the request. However, the copy request may be blocked or modified in any other suitable manner, in accordance with embodiments of the present disclosure.

In some embodiments, the request may not be blocked, but may be delayed. In these embodiments, the request may be stored in the memory until certain conditions are met. For example, the request may be delayed pending further authentication (e.g., two-factor authentication).

At operation 212, if the response flag is set, then a response may be generated based on the copy request. A response may be generated in any manner and may conceal the denial of the copy request. In some embodiments, generating the response may include generating fabricated hashes and forwarding the fabricated hashes to the requestor. Further, the response also may include additional authentication necessary to access the file.

In some embodiments, generating a response may include generating one or more dummy hash files, or a dummy replacement of a portion of a file that contains hashes. The dummy content can include hashes which do not correspond to the passwords stored in the original hash file. Dummy hash files may be generated in any manner. In some embodiments, dummy hashes may be randomly generated. The hashes may correspond to the length of the hash values stored in the original hash folder. Further, the dummy hashes may be generated based on the range of acceptable password inputs (e.g., password length and acceptable symbols). This may be completed to conceal the fact that the hashes are not genuine.

In some embodiments, dummy hashes may be generated by scrambling (e.g., mixing up) the original hashes. The hashes may be scrambled in any manner. For example, in some embodiments, hashes may be scrambled individually. However, in some embodiments, hashes may be scrambled collectively (e.g., combined and mixed), and thereafter isolated into scrambled hashes, in some embodiments including uniform data lengths.

In some embodiments, dummy hashes or other dummy content can be included in folders of dummy content. The dummy hashes or other dummy content may be based on fabricated usernames, fabricated passwords, or other fabricated content, which may stand in place of the original hash content in the dummy content folder and sent to a requestor of a copy operation. In some embodiments, fabricated passwords or other fabricated content may be randomly generated. In some embodiments, the original passwords or other original content may be scrambled. For example, hashes may be generated based on the scrambled content and stored in a dummy hash folder. The number of passwords may be commensurate with the number of password hashes included in the original hash folder.

In some embodiments, the dummy hashes may be generated by modifying the original hashes. In these embodiments, a transmitted portion of the original hash may be altered (e.g., replaced with random bits of data), such that the hash maintains a uniform length, in order to conceal the fact that the hashes were modified.

Further, the response may include modifying a transmitted portion of the original hash file, as opposed to generating a dummy hash file. In some embodiments, a copy of the original hash file may be corrupted and transmitted to the requestor. In some embodiments, the original hash file may be further encrypted, or further protected by authentication.

The response also can include modification of the original content of the file subject to copy protection. Several embodiments are disclosed herein and are intended as examples only for purposes of illustrating a range of actions that can be automatically taken, within the response.

In some embodiments, a backup of the original content is generated in a folder separate from the original content, and the original content is replaced in its original location with a dummy version of the content. A service can execute to arrange for later administrator logins, possibly requiring additional credentials, to operate based on the backup of the original content. That is, a backup of the original hash may be generated, and the original hash may then be corrupted (e.g., altered such that the hash no longer corresponds to the original password) in any manner. In some embodiments, the hash is modified by means similar to previously mentioned methods for generating dummy hash files. These methods may include scrambling the hashes, replacing random bits of the hash with other random bits, running the hashes through additional iterations of the hash algorithm (or a different hash algorithm), or combining hashes, while maintaining a fixed length. However, the original hash may be corrupted, modified, altered, or rendered unintelligible in any other manner.

The response may further include encrypting the hash file in response to receiving the copy request. In some embodiments, applying further protection to the hash file, such as encryption, may be used to prevent copying the hash file. The hash file may be encrypted using any encryption algorithm, and may be symmetric or asymmetric. For example, the encryption algorithm used may be Triple DES, RSA, Blowfish, Twofish, or Advanced Encryption Standard (AES) or any other suitable encryption algorithm. Further, the encryption key used may be complementary to the selected encryption algorithm. For example, if the encryption algorithm used is asymmetric, there may be both a private and public key used to encrypt and decrypt the hash file respectively. Any suitable type or number of encryption algorithms respective to the encryption requirements of an organization may be implemented.

Furthermore, the response may include intercepting and modifying the copy request. In some embodiments, a runtime patch may be applied to computer instructions responsible for processing the copy request. The runtime patch may include intercepting the operation, as a part of the copy request, and altering the request. The instructions that handle the copy request may be altered such that, instead of providing a copy of the hash file, the copy request is directed to a dummy hash file. Further, the copy request may be altered such that the original hash file is backed up and subsequently corrupted, and such that the backed up version becomes the version referenced by privileged accounts other than the one from which the copy request originated. Additionally, the copy request may be intercepted and the behavior of the copy operation modified by a runtime patch such that the hash file is further encrypted. Though a runtime patch may be implemented to intercept and modify the copy request, any other method of redirecting/altering the request may be used.

In some embodiments, the copy request may be intercepted by a security application running on the host device. In these embodiments, after a copy request is received, the security application may intercept and modify the command prior to the command issuing (e.g., by implementing a runtime patch). The security application may take the form of high-level application software, a service, a device driver, an enhancement to an operating system, virtual machine, hypervisor, or network communication system, or any combination of these. Embodiments of the present disclosure may take the form of an entirely hardware embodiment implemented in microcode, firmware, or other similar technology. Embodiments of the present disclosure may be embodied in a combination of hardware and software.

In some embodiments, a copy operation is recognized as including a combination of one or more operations that involve loading content from a first one or more storage media into memory, together with one or more operations that involve storing the content to a second one or more storage media. The second one or more storage media can be either identical to or different from the first one or more storage media. A security application can intercept both the load and store operations via any of several means. One interception means includes a device driver that manages the storage media, in which a load operation is detected, the memory location(s) of the loaded content are tracked, and the attempt to store the content from the memory location(s) to the one or more storage media can serve as the trigger for the interception of the copy request and thus for the arrangement of the methods disclosed in FIG. 2 and elsewhere herein.

Another interception means includes a service, implemented in software, that manages the memory into which secured content is loaded and by which the load operation is detected and at least one memory location of the loaded content is tracked. Based on a comparison of the tracked memory location and any memory locations used in storing content, the service also can detect an attempt to store the secured content from memory to the one or more storage media, so that the storage attempt can serve as the trigger for the interception of the copy request and thus for the arrangement of the methods disclosed in FIG. 2 and elsewhere herein.

Another interception means includes application software that intercepts load and store API function calls, or code or instructions in other routines, involving the storage media. The application software can perform a runtime patch on the intercepted functions or routines, to arrange triggering of the interception of the copy request and thus for the arrangement of the methods disclosed herein. In various embodiments, the interception can be established via system call interception, memory access interception, hooks, or operating system intervention. System call interception can be arranged via code instrumentation, such as by instructions inserted into object code or byte code. Hooks can be arranged via platform-dependent code such as the SetWindowsHookEx( ) API function provided on the Microsoft Windows® (Microsoft Corporation WASHINGTON One Microsoft Way Redmond WASHINGTON 98052) platform. Operating system intervention can be arranged via various means. A runtime patch can be performed not only by application software but also by a service, a device driver, or an operating system component.

An interception means based on operating system intervention includes an enhancement to the operating system, in which API function code or other routines involving the storage media perform steps such as those of FIG. 2 to embody the inventive arrangements disclosed herein. A modified form of an API function that performs storage of content previously loaded into memory can identify an attempt to store a copy of a specific file that has been loaded, and can handle the situation in accordance with embodiments disclosed herein. A modified version of any executable code provided by the operating system to load and store content also can be arranged in accordance with the inventive arrangements disclosed herein. Thus various embodiments of the present disclosure can be embodied via application software, a service, a device driver, one or more operating system API functions, or one or more other operating system components suitable for carrying out the various operations of the present disclosure.

In some embodiments, interception may include hardware that manages the media in which content is stored, hardware that manages the memory into which stored content is loaded, or both, and that performs the steps such as those of FIG. 2 to embody the inventive arrangements disclosed herein. Any means possible for intercepting load and store operations that collectively comprise a copy operation can be utilized in the manner disclosed herein.

In embodiments that employ a runtime patch, the patch can be applied at the time when a load operation or store operation is invoked, in order to intercept the load operation or store operation applicable to secured content, and can be left in place for the rapid interception of further load operations or store operations. In other embodiments, the runtime patch can be removed during or after completion of the load operation or store operation, and the original load or store functionality can be restored. The runtime patch can be removed immediately after the store operation or after a timeout, an interrupt, an event such as a store operation involving memory location(s) that are not tracked as containing content subject to copy protection, an exit of a routine such as the routine that has invoked the load and store operations, or a memory write operation such as an operation that updates the memory containing the copy-protected content. More than one store operation may be intercepted, involving the copy-protected content, and each such operation may be treated as a separate copy attempt in an embodiment.

In some embodiments, interception of a load operation can trigger functionality that identifies whether the content being loaded requires privileged access, as shown in operation 202 of method 200 as depicted in FIG. 2. The functionality triggered by the intercepted load operation also can determine whether the content is subject to copy protection, as shown in operation 204. In the event that content subject to copy protection is loaded, the memory location(s) into which the content is loaded can be tracked in list, array, or vector of objects or data structures designated for tracking loaded secured content. That is, these objects or data structures can track pointers or references to any loaded content that is subject to copy protection. In certain embodiments, these tracking objects or data structures also can track the response flag 208. Interception of a store operation can trigger functionality that identifies whether a pointer or reference to the content to be stored is to be tracked in the list, array, or vector tracking objects or data structures. Depending on the response flag 208, the attempt to store the content may be blocked as in operation 210, or a storage operation may occur as in operation 212, such that the data generated in response to the copy operation may be replaced, scrambled, or otherwise modified with respect to the secured content loaded in memory. By this means, the secured content can be used for legitimate purposes, such as password validations, while copy protection of the secured content is retained.

Thus in various embodiments, attempts to copy selected copy-protected content, such as a hash file, can be intercepted via a range of techniques including a number of techniques that intercept API function calls and memory load and store operations. An embodiment also can provide replacement versions of typically executed commands and utilities provided by an operating system, in which the replacement versions are modified in accordance with the inventive arrangements disclosed herein. There are many other prospective embodiments, not disclosed herein, that may nonetheless act in accordance with the inventive arrangements disclosed herein.

After a response is generated at operation 212, the response may be transmitted at operation 214. The response may be transmitted back to the requestor that requested a copy of the hash file. In some embodiments, a dummy file containing fabricated hashes is transmitted to the requestor. In some embodiments, a modified version (e.g., scrambled, altered) of the original hash file is transmitted to the requestor. In some embodiments, an indication that the file was encrypted in response to the copy request may be transmitted to the requestor, requiring further authentication to access the original hash file. However, transmitting response data at operation 214 may depend on the response generated at operation 212.

After either the copy request has been blocked at 210 or response data has been transmitted in response to the copy request at operation 214, the host device may be configured to restrict requestor access at operation 216. Because the requestor has attempted to execute a copy request requiring privileged access, the requestor may have access to additional privileged commands. This may leave the computer environment vulnerable to attack (e.g., including potential data loss), as the requestor may have the ability to execute additional commands. These commands may include copying additional files, modifying system configuration parameters, or modifying directories, to name a few.

The requestor may be restricted in any manner, including privilege revocation and lockout. In some embodiments, the privilege of the requestor may be revoked, which may prevent the requestor from executing privileged commands. In some embodiments, privilege revocation may be concealed, such that the requestor is not aware that he or she is being monitored. In these embodiments, the privileged commands may appear to be executed, but may not actually modify system configurations. Further, any data requests may transmit fabricated data, rather than genuine data. The requestor will effectively be quarantined via such an embodiment.

In some embodiments, the requestor may be locked out of the system entirely. Lockout may require further authentication in order for the requestor to access the system. In some embodiments, lockout may include a time period (e.g., 1 day) before the requestor can attempt access (e.g., through authentication). This may allow the system administrator to determine the source of the request, and whether or not the source was harmful to the computing environment. However, the requestor's access may be restricted in any manner not limited to those measures described herein. For example, in some embodiments, the requestor may only be prevented from read/write access to any privileged content. Additionally, in some embodiments, lockout may include disabling or deleting the requestor account or may require multifactor authentication, smart card/key access, biometric validation, or other further authentication.

Restricting the requestor's access may be based on the notification received by the administrator (e.g., including the requestor's information and the copy attempt). In some embodiments, the administrator may consider information reported in the notification of the copy attempt in determining to restrict access or lock the account (e.g., account name, IP address, MAC address, domain, etc.). In some embodiments, access restrictions, account modifications, or other measures can be taken automatically based on the notification of the copy attempt. The notification can be associated with metadata including but not limited to the requestor's IP address, one or more identifiers for the compromised account and any compromised files, copy attempts, and timestamps. Measures to be taken, such as actions to be triggered, can be arranged via configurable rules operable based on the metadata or other information associated with the notification.

At operation 218, a copy notification may be transmitted to the requestor. The copy notification may provide the requestor with information relating to the completion status of the copy request. For example, if the copy request was blocked at operation 210, the copy notification may include a message to the requestor that the copy attempt was unsuccessful. However, if response data including one or more dummy hash files were transmitted to the requestor, the copy notification may include a message or other indication to the requestor that the copy attempt was successful, in keeping with the normal indication of successful copy completion. This may undermine the ability of the requestor to determine that the requested copy was not authentically delivered. In other embodiments, if the hash file was encrypted in response to the copy request, then the copy notification may include a message indicating that the requested hash file was encrypted, and that the copy request was unsuccessful.

The aforementioned operations may be completed in any order and are not limited to those described. Additionally, some, all, or none of the aforementioned operations may be completed, while still remaining within the spirit and scope of the present invention. For example, in some embodiments, operation 208 may not be completed, as operation 210 may be completed in each instance for a copy request (e.g., the copy request may be blocked in each instance of a copy request).

Figure 3:
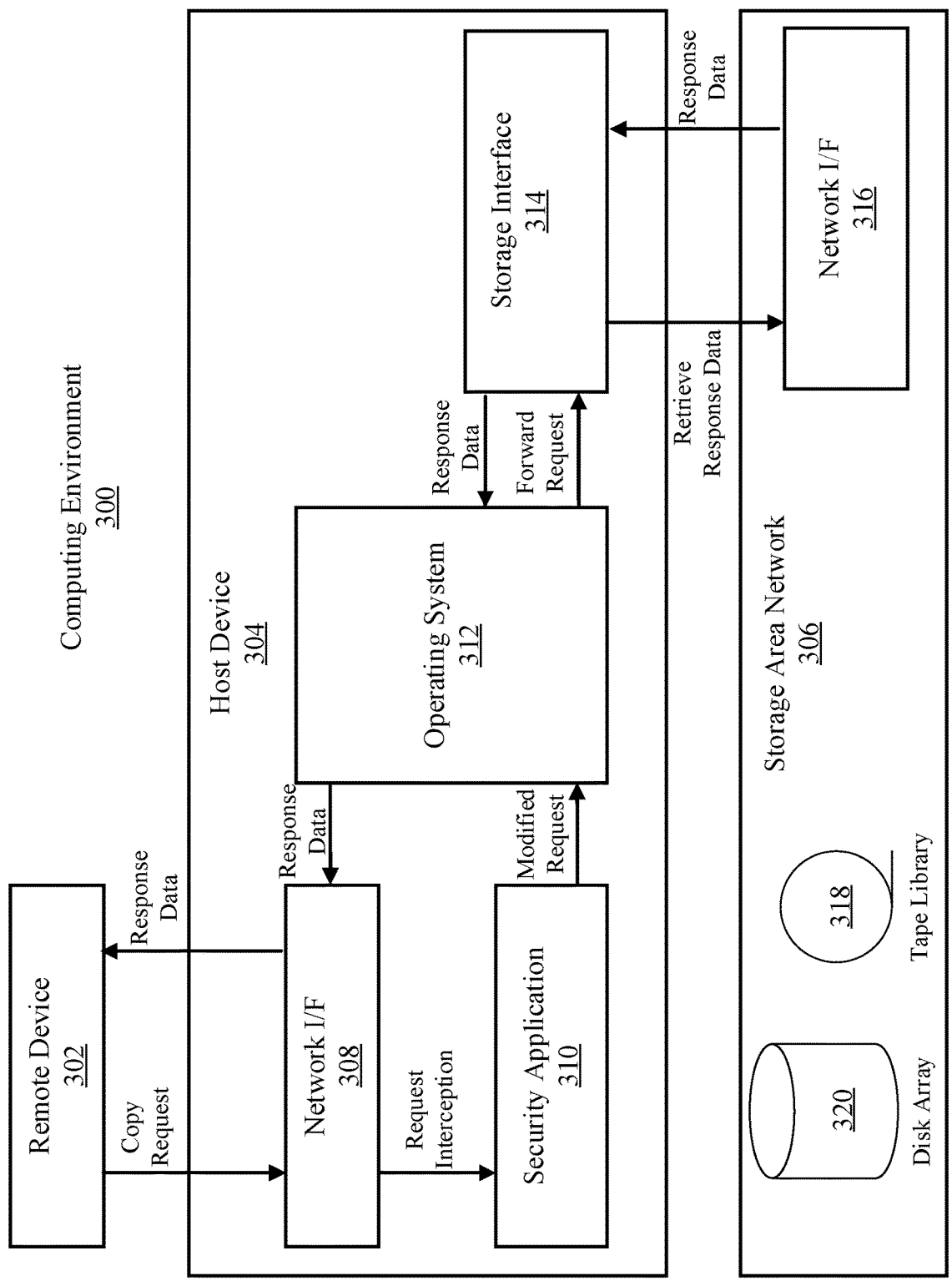
FIG. 3 depicts information flow of a copy request and copy response in a computing environment in which illustrative embodiments of the present disclosure may be implemented.

Referring now to FIG. 3, shown is a block diagram of a computing environment 300 including an example copy request and response, in accordance with embodiments of the present disclosure. The remote device 302 and host device 304 may be the same as, or substantially similar to, the remote device 102 and host device 104, respectively, as described with respect to FIG. 1.

As previously mentioned, in some embodiments the remote device 302 may be configured to transmit a copy request to the host device 304. The request may be transmitted over a network, and may be received at network interface 308 of the host device. After the request is received by the network interface 308 of the host device, it may be intercepted by a security application 310. The security application 310 may include a runtime patch to intercept the operation in response to receiving the request. In some embodiments, the copy request may be received by the operating system 312 of the host device 304, and may be redirected to the security application by a runtime patch included in the operating system. In some embodiments, the entire process can take place on a single device, as when a hacker gets physical access to a system without involving a remote device, and a security application may intercept a copy request made by the hacker so that the copy request may be similarly redirected, as described herein.

The request may be modified by the security application 310 such that it does not complete the copy request. The copy request may be modified in any manner. In some embodiments, the copy request is modified such that the request is redirected to a dummy hash file. The dummy hash file may be located remotely, and the copy request may be modified such that it is redirected to the remotely stored dummy hash file. In some embodiments, the security application 310 may modify the copy request such that the copy of the hash file is corrupted prior to transferring it to the requestor. In these embodiments, one or more portions of the original file may be transferred to the requestor; however any hashes in it may be modified. In some embodiments, the security application may modify the request such that the hash file is encrypted. The security application may modify the copy request in any other manner that is otherwise consistent with the present disclosure. As depicted in FIG. 3, the copy request or code that handles it is modified such that the request is redirected to a dummy hash file.

After the request is modified, the security application 310 may transmit the modified copy request, or portions thereof, to the operating system 312 so as to complete a modified copy operation in accordance with the present disclosure. The operating system 312 may not complete the copy request, as the modified copy operation may include a patch (e.g., modified address) to redirect the copy request to a storage area network 306. Accordingly, the operating system 312 may forward the request to a storage interface 314, which may be configured to perform the modified copy operation using storage area network 306. The storage interface 314 may be communicatively coupled to a network interface 316 of the storage area network 306 such that the modified request is transmitted to the storage area network 306, which may be remotely located.

After the network interface 316 of the storage area network 306 receives the copy request, the storage area network may be configured to retrieve the relevant response data. As previously mentioned, the copy request may be modified such that it is directed to a dummy hash file located on the storage area network 306. The dummy hash file may be stored in memory located on the storage area network 306. For example, the dummy hash file may be stored in a disk array 320 or a tape library 318 of the storage area network 306. Though a disk array 320 and tape library 318 are shown in FIG. 3, the storage area network 306 may include any other type of memory or storage device, including a Redundant Array of Independent Disks (RAID), flash storage, Read Only Memory (ROM), Random Access Memory (RAM), and optical discs, to name a few. In some embodiments, the dummy hash file can reside on a storage device directly accessible by operating system 312 and connected to a computer on which operating system 312 runs.

After the storage area network 306 receives the request, response data may retrieved, which may include a dummy hash file containing fabricated hashes. The storage area network 306 may then transmit the response data back to the storage interface 314 of the host device 304 through the network interface 316. The response data may be received by the operating system 312 of the host device and forwarded back to the network interface 308, where the response data may be transmitted back to the remote device 302. The requestor (e.g., host device 302) may receive the dummy hash file and any other response data (e.g., a notification that the copy request was successfully completed).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
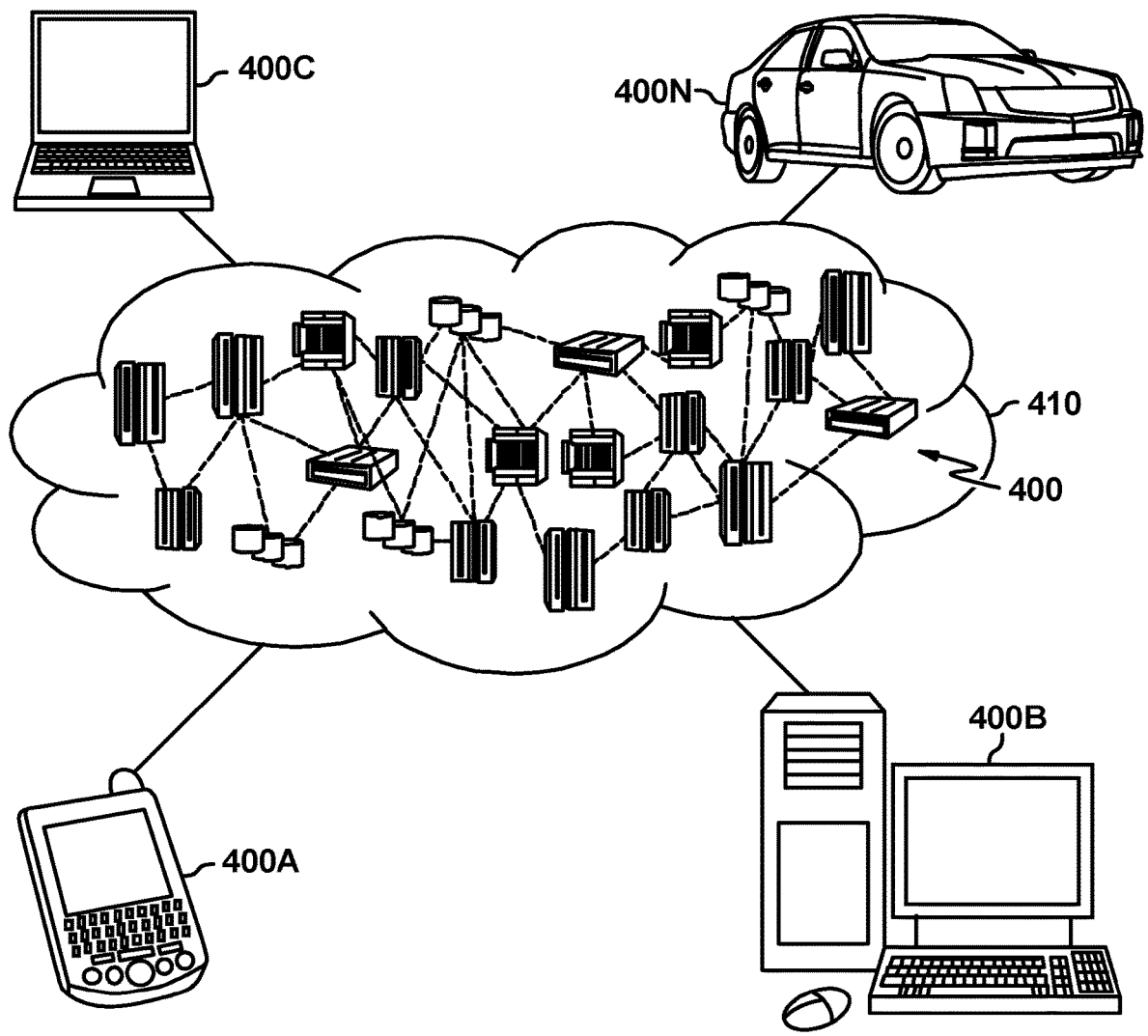
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B (e.g., host device 104, host device 304, remote device 102 or remote device 302) laptop computer 400C (e.g., host device 104, host device 304, remote device 102 or remote device 302), and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
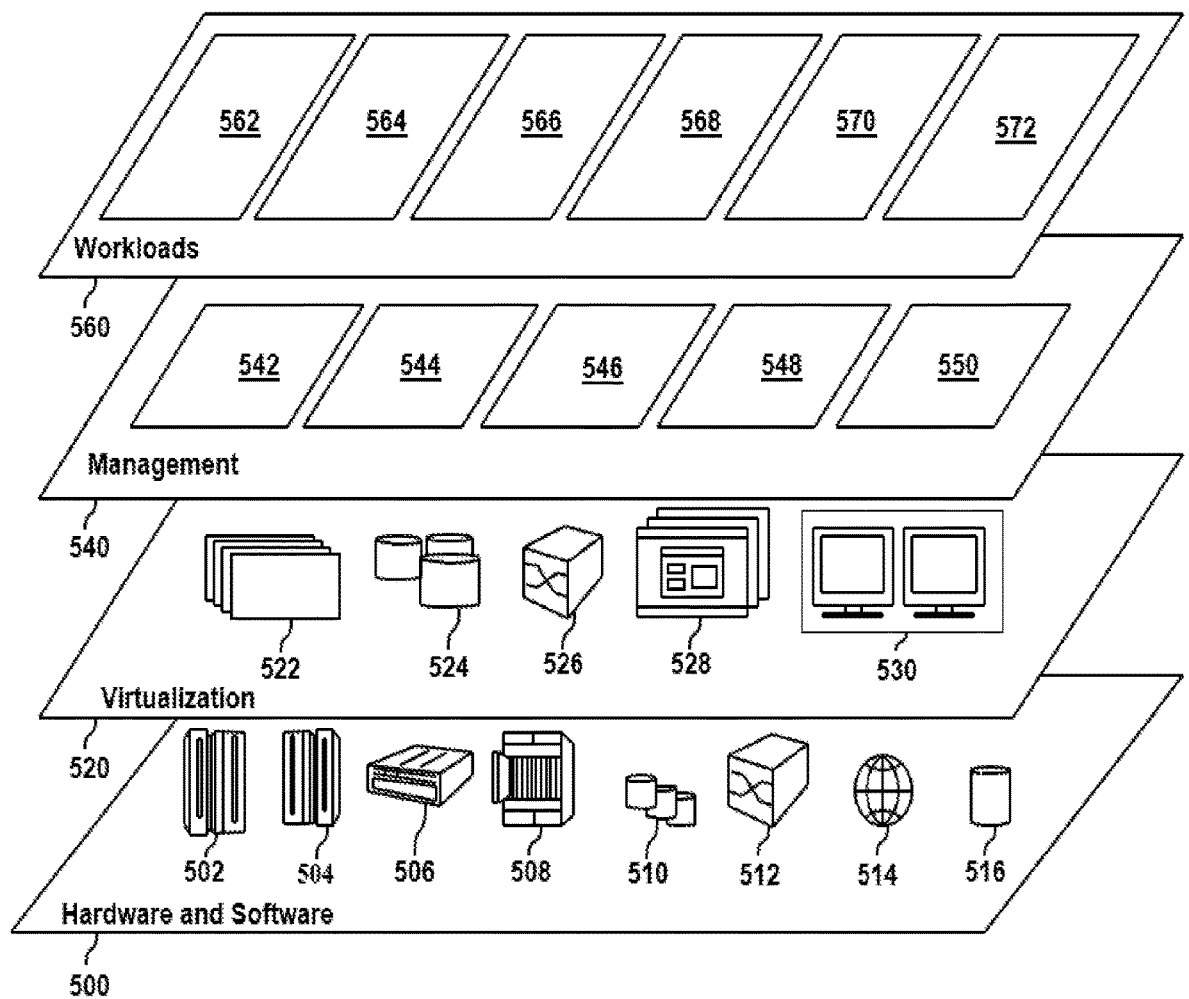
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. For example, security may include a copy protection application, which may identify copy requests requiring privileged access, determine that the request is directed toward a hash file, and apply copy protection in response to determining that the request is directed toward a hash file. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and identifying an identifiable media 572.

Figure 6:
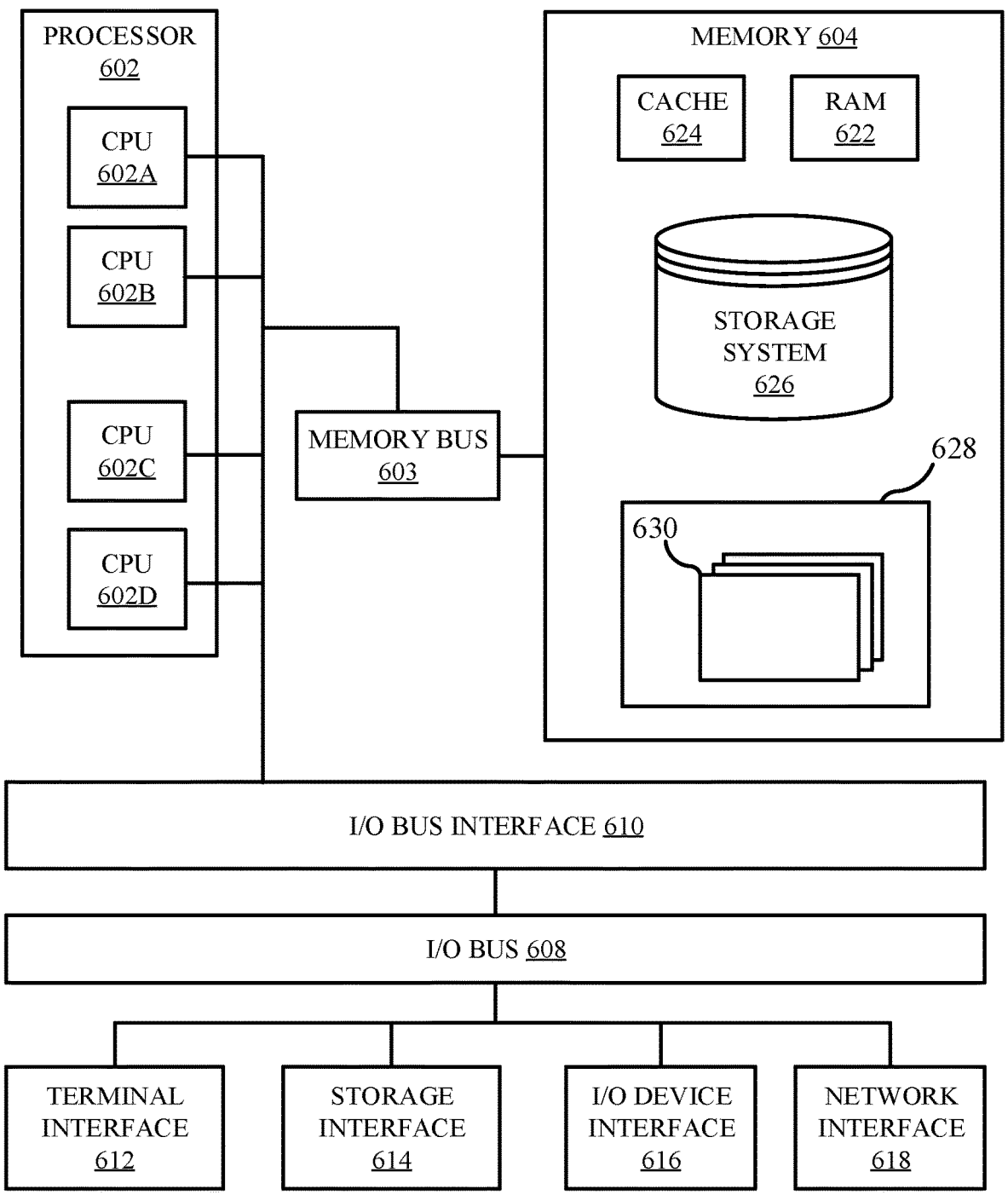
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., host device 104, host device 304, remote device 102, or remote device 302) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

In some embodiments, the program modules 630 of the computer system 601 may include a security module. The security module may include computer instructions to intercept and modify a copy request. For example, the computer instructions may include a runtime patch to intercept the copy request, in response to receiving the copy request. After the copy request is intercepted, the copy request may be modified/handled in any manner. In some embodiments, the copy request is modified in order to retrieve response data generated by the computer system 601.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
receiving, by a processor, a request to copy a file protected by superuser privileges from a requestor with superuser privileges, wherein superuser privileges include access to adjust kernel options, modify system files, modify run level, and adjust resource usage limits;
determining that the file contains one or more hashes and thus is subject to copy protection;
transmitting, in response to determining that the file is subject to copy protection, a notification of the copy attempt; and
applying copy protection to the file, wherein applying copy protection to the file includes modifying the one or more hashes to generate a dummy version of each of the one or more hashes, generating a dummy version of the file containing the dummy version of each of the one or more hashes, and transmitting the dummy version of the file to the requestor.

2. The method of claim 1, the method further comprising:
determining requestor information; and
restricting the requestor's access based on the requestor information.

3. A system comprising:
a memory storing program instructions;
a processor configured to execute the program instructions to perform a method comprising:
receiving a request to copy a file protected by superuser privileges from a requestor with superuser privileges, wherein superuser privileges include access to adjust kernel options, modify system files, modify run level, and adjust resource usage limits;
determining that the file contains one or more hashes and thus is subject to copy protection;
transmitting, in response to determining that the file is subject to copy protection,
a notification of the copy attempt; and
applying copy protection to the file, wherein applying copy protection to the file includes modifying the one or more hashes to generate a dummy version of each of the one or more hashes, generating a dummy version of the file containing the dummy version of each of the one or more hashes, and transmitting the dummy version of the file to the requestor.

4. A computer program product comprising a computer readable storage medium having program instructions embodied therewith, the program instructions executable by a processor to cause the processor to perform a method comprising:
receiving a request to copy a file protected by superuser privileges from a requestor with superuser privileges, wherein superuser privileges include access to adjust kernel options, modify system files, modify run level, and adjust resource usage limits;
determining that the file contains one or more hashes and thus is subject to copy protection;
transmitting, in response to determining that the file is subject to copy protection, a notification of the copy attempt; and
applying copy protection to the file, wherein applying copy protection to the file includes modifying the one or more hashes to generate a dummy version of each of the one or more hashes, generating a dummy version of the file containing the dummy version of each of the one or more hashes, and transmitting the dummy version of the file to the requestor.

* * * * *